United States Patent
Harkness et al.

[11] 3,747,528
[45] July 24, 1973

[54] AIRCRAFT PARACHUTE FLARE HAVING TAPERED CORE CANDLE

[75] Inventors: Benjamin F. Harkness; Billy J. Humerickhouse, both of Odon; Norbert E. Matheis, Jasper; Alfred W. Norris, both of Bloomington, all of Ind.

[73] Assignee: The United States of America as represented by the Secretary of the Navy, Washington, D.C.

[22] Filed: Feb. 25, 1972

[21] Appl. No.: 229,609

[52] U.S. Cl. ................ 102/35, 102/35.6, 244/142
[51] Int. Cl. .............................................. F42b 13/38
[58] Field of Search ...................... 102/35–35.6, 37.1, 34.1; 244/142

[56] References Cited
UNITED STATES PATENTS

| | | | |
|---|---|---|---|
| 1,709,644 | 4/1929 | Wiley, Jr. | 102/35 UX |
| 2,043,268 | 6/1936 | Skinner | 102/34.4 |
| 2,582,113 | 1/1952 | Finken et al. | 102/35 UX |
| 3,515,362 | 6/1970 | Richardson et al. | 102/35 X |

FOREIGN PATENTS OR APPLICATIONS

| | | | |
|---|---|---|---|
| 255,769 | 11/1927 | Italy | 102/35 |

*Primary Examiner*—Robert F. Stahl
*Attorney*—R. S. Sciascia, Paul S. Collignon et al.

[57] ABSTRACT

An aircraft parachute flare having an outer case of consumable material filled with a candle of pyrotechnic material. The pyrotechnic candle is provided with a tapered core that provides a chamber for storing a parachute. An environmental fuze is provided for initiating parachute deployment and deployment of the parachute initiates an igniter which, in turn ignites the pyrotechnic candle.

4 Claims, 4 Drawing Figures

AIRCRAFT PARACHUTE FLARE HAVING TAPERED CORE CANDLE

CROSS-REFERENCE TO RELATED APPLICATION

Patent application of Carroll Abel et al., entitled, "Variable Delay Fuze For Aircraft Parachute Flare", Ser. No. 769,999, filed Oct. 23, 1968.

BACKGROUND OF THE INVENTION

The present invention relates to an aircraft parachute flare and more particularly to a flare having means for storing a parachute inside a pyrotechnic candle.

Aircraft parachute flares are used for various military purposes and one type which is most frequently used consists of an outer container having a fuze or triggering means, a pyrotechnic candle and a parachute. The candle and parachute are positioned within the outer container and after launching or dropping, the candle and parachute are ejected from the container. In current flare launchings, fuze actuation is initiated by the flare's weight pulling on a lanyard attached to an aircraft or drogue. A safety pin is normally provided to prevent accidental ignition of the flare in current use and, once removed, a pull of about 12 pounds on the lanyard will start on irreversible fuze functioning. Explosive ejection of the candle from the outer container constitutes a possible missile hazard. In one flare in current use, the candle is ejected from its container at a velocity of about 150 feet per second and the outer container travels more than 100 yards. In order to prevent premature actuation of flares that are mounted on external racks on aircraft, elaborate lanyard taping procedures must be followed and, if the flare is not launched, extreme care must be taken to avoid contact with the lanyard while replacing the safety pin.

When flares in current use are deployed in a normal manner, the outer case free falls to the ground and presents a potential hazard to friendly forces. Additionally the material falling to the ground could be of some use when recovered by enemy forces.

SUMMARY OF THE INVENTION

The present invention relates to an aircraft parachute flare having a pyrotechnic candle cast within a consumable container. The pyrotechnic candle is provided with a conically shaped bore which is used to store a parachute. Deployment of the parachute is initiated by an environmental fuze, and deployment of the parachute initiates an igniter which, in turn, ignites the pyrotechnic candle.

DESCRIPTION OF THE PREFERRED EMBODIMENT

Figure 1:
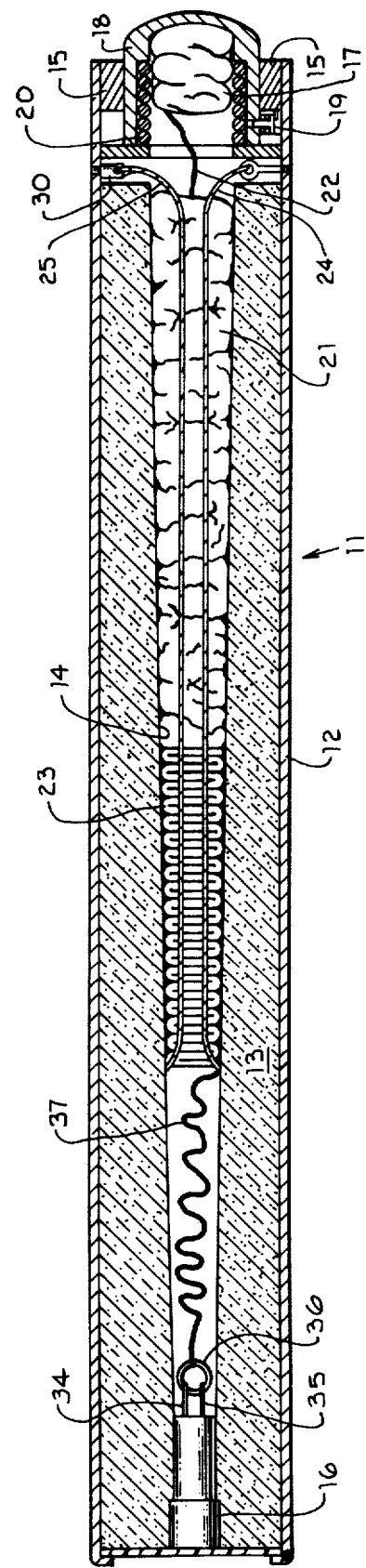
FIG. 1 is a sectional view showing a preferred embodiment of the present invention.
Figure 4:
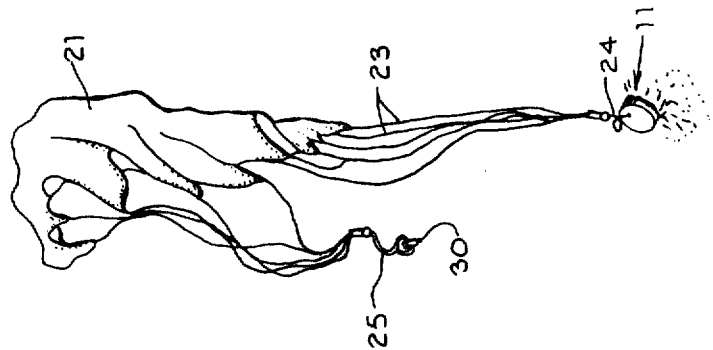
FIG. 4 is a diagrammatic view showing the parachute of FIG. 2 in a collapsed condition.

Referring now to the drawings, in FIG. 1 there is shown an aircraft parachute flare 11 having a cylindrical case 12 of consumable material which contains a pyrotechnic candle 13. By way of example, case 12 might have a thin wall and be made of aluminum, and candle 13 might be comprised of a mixture of between 56 and 60 percent, by weight, of magnesium, between 35 and 40 percent, by weight of sodium nitrate and between 3.5 and 12 percent, by weight, of a binder system comprised of between 51 and 71 percent, by weight, of liquid epoxy resin of the bisphenol A Epichlorohydrin type containing cresyl glycidyl ether, between 16 and 36 percent, by weight, of liquid epoxy resin of the Polyglycol-Epichlorohydrin type and between 10 and 15 percent, by weight, of a hardener, such as an aliphatic polyamine. A tapered hole 14 is provided in candle 13 with the smallest cross-sectional area of hole 14 being at the end of the candle which is first ignited and burned. If the length of candle 13 burns at a uniform rate, a greater volume of pyrotechnic material will be consumed when the candle is first ignited and thus provide greater illumination when the candle is farthest from the ground.

An environmental arming mechanism 15 is attached to one end of case 12 and an igniter assembly 16 is shown positioned at the opposite end. Environmental arming mechanism 15 might be one of many well-known devices which are used to sense various conditions such as acceleration, time of fall, tumbling, barometric pressure, and the like. The basic function of an environmental arming mechanism is two-fold, namely to initiate ignition of the pyrotechnic candle at a desired altitude, but more important, to prevent ignition in the event that the flare device is accidental dropped, bumped or damaged. By way of example, one type of environmental fuze is shown and described in U.S. Pat. No. 3,421,442, entitled, "Environmental Fuze Device For Air-Dropped Flares And The Like", which issued Jan. 14, 1969, to Donald R. St. Clair.

A drogue chute 17 is provided within a drogue cap 18 which is retained in position by locking pin 19. A compression spring 20 is provided to eject drogue cap 18 when locking pin 19 is withdrawn from cap 18 by action of arming mechanism 15 and, upon ejection of drogue cap 18, drogue chute 17 is deployed. A main parachute 21 is attached to drogue chute 17 by means of cable 22, and shroud lines 23 of parachute 21 are connected to case 12 by suspension cables 24 and 25. Cable 25 is attached to case 12 by means of an explosive bolt 30 which severs upon application of heat to collapse parachute 21.

Figure 3:
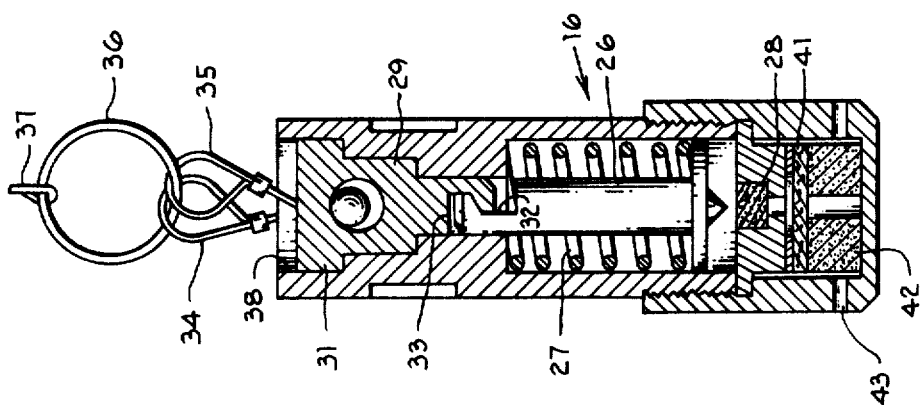
FIG. 3 is a sectional view showing a firing pin assembly.
Figure 2:
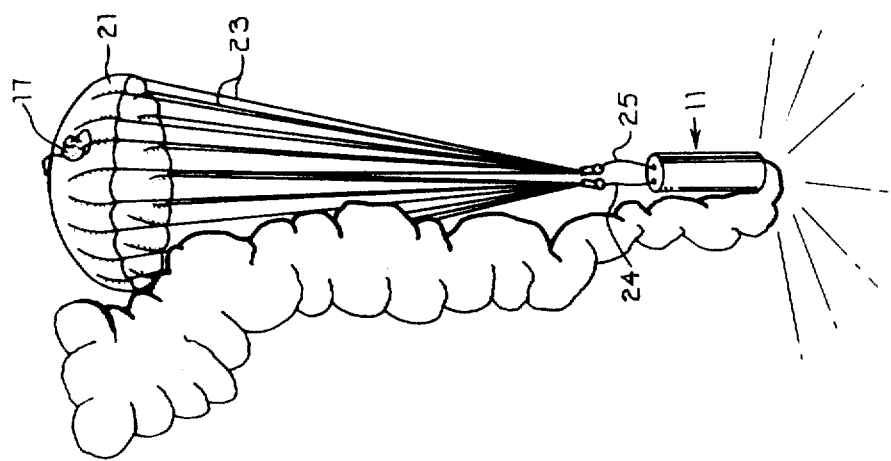
FIG. 2 is a diagrammatic view showing a preferred embodiment of the present invention with a parachute being deployed.

Referring now to FIG. 3 of the drawing, there is illustrated one manner by which candle 13 might be ignited. Igniter 16 contains a firing pin 26 which is actuated by spring 27. Spring 27 provides a small biasing force on firing pin 26, however, firing pin 26 does not engage primer 28 as firing pin 26 is restrained by release pin 29 and the forward movement of release pin 29 is limited by a shoulder portion 31. A notch 32 is provided in the rearward end of firing pin 26 and the rearward most side of notch 32 is a tapered surface. Likewise, a mating notch 33 is provided in the forward end of release pin 29, and the forward most side of notch 33 is provided with a complementary tapered surface which engages the tapered surface of notch 32. As shown in FIG. 1 of the drawing, a pair of short cables 34 and 35 are attached to release pin 29 and ring 36 which, in turn is connected by cable 37 to suspension cable 24. Upon deployment of parachute 21, a force is applied to short cables 34 and 35 and release pin 29 moves rearwardly and pulls firing pin 26 rearwardly thereby compressing spring 27. As long as shoulder portion 31 of release pin 29 is still in bore 38, release pin 29 moves in a straight line and firing pin 26 stays engaged with release pin 29. When shoulder portion 31 clears bore 38, the continued pull by short cables 34 and 35 causes release pin 29 to become disengaged from firing pin 26 due to the tapered surfaces in notches 32 and 33. Upon disengagement of firing pin 26 from release pin 29, spring 27 drives firing pin 26 forward to detonate primer 28. Z-2 paper 41 and ignition pellet 42 are, in turn, ignited and heat and flame from ignition pellet 42 passes through holes 43 to ignite candle 13.

OPERATION

Upon dropping the aircraft parachute flare 11 from an aircraft, arming mechanism 15 senses the predetermined environmental condition, such as altitude, and reacts to permit locking pin 19 to be withdrawn from drogue cap 18. Spring 20 then ejects drogue cap 18 and drogue chute 17 is deployed. Deployment of drogue chute 17, in turn, causes main parachute 21 to deploy, whereupon igniter assembly 16 ignites candle 13.

The burning of candle 13 consumes case 12, which might be of aliminum or other consumable material, and the burning of case 12 also provides additional illumination. The narrow portion of tapered hole 14 is adjacent the end of candle 13 that is ignited and thus a greater volume of pyrotechnic material is burned when the flare is farthest from the target.

When candle 13 and case 12 are substantially consumed, heat from the burning composition causes explosive bolt 30 to rupture, and as one-half of shroud lines 23 of parachute 21 are attached to bolt 30 through suspension cable 25, parachute 21 collapses and flutters to the ground. The collapse of parachute 21 prevents its drifting and becoming a hazard to aircraft that might be in the area.

We claim:

1. An aircraft parachute flare comprising:
   a case of consumable material,
   a candle of pyrotechnic material positioned inside said case and having a concentrically positioned tapered hole extending end to end thereof,
   a parachute stored in said tapered hole having a drogue chute attached and having a plurality of shroud lines attached to one end of said case,
   an igniter assembly positioned in said hole of said candle at the end of said case opposite to the end at which said shroud lines are attached,
   environmental fuze means for deploying said drogue chute positioned in said case at the end to which said shroud lines are attached, and
   means connected to said parachute for actuating said igniter assembly whereby said candle of pyrotechnic material is ignited upon deployment of said parachute.

2. An aircraft parachute flare as set forth in claim 1 wherein said igniter assembly is positioned in said tapered hole at the end wherein the hole is lesser in diameter than the opposite end whereby a greater volume of pyrotechnic material is burned when the aircraft parachute flare is farthest from the ground.

3. An aircraft parachute flare as set forth in claim 1 wherein said case is aluminum.

4. An aircraft parachute flare as set forth in claim 1 wherein one-half of said shroud lines of said parachute are connected to an explosive bolt attached to said case whereby heat from burning pyrotechnic material detonates said bolt to release said one-half of said shroud lines from said case and cause collapse of said parachute.

* * * * *